(12) United States Patent
Li et al.

(10) Patent No.: US 12,553,457 B2
(45) Date of Patent: Feb. 17, 2026

(54) FASTENER

(71) Applicant: Illinois Tool Works Inc., Glenview, IL (US)

(72) Inventors: Zhilin Li, Shanghai (CN); Haijie Yu, Shanghai (CN); Zhaobao Cao, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/367,339

(22) Filed: Sep. 12, 2023

(65) Prior Publication Data
US 2024/0109501 A1    Apr. 4, 2024

(30) Foreign Application Priority Data

Sep. 29, 2022   (CN) .......................... 202211204142.0
Aug. 21, 2023   (CN) .......................... 202311055946.3

(51) Int. Cl.
*F16B 2/24*      (2006.01)
*B60R 21/20*     (2011.01)
*F16B 5/06*      (2006.01)

(52) U.S. Cl.
CPC ................................ *F16B 5/0621* (2013.01)

(58) Field of Classification Search
CPC ...... F16B 2/243; F16B 5/0642; F16B 5/0088; F16B 5/0621; Y10T 24/306; Y10T 24/304; Y10T 24/307
See application file for complete search history.

(56) References Cited

U.S. PATENT DOCUMENTS

| | | | |
|---|---|---|---|
| 5,759,004 A * | 6/1998 | Kuffel ................... | F16B 21/086 24/295 |
| 5,833,480 A * | 11/1998 | Austin .................. | H05K 7/142 24/453 |
| 2011/0232049 A1* | 9/2011 | Ribes Marti .......... | F16B 37/043 24/458 |

(Continued)

*Primary Examiner* — Jason W San
*Assistant Examiner* — Michael S Lee
(74) *Attorney, Agent, or Firm* — McAndrews, Held & Malloy, Ltd.

(57) ABSTRACT

The present disclosure relates to the technical field of vehicle components, and in particular to a fastener for securing vehicle accessories, characterized in that the fastener includes: a fastener body, a trim panel securing portion, and an elastic member securing portion, wherein the fastener body includes a vehicle securing portion which is disposed on one end of the fastener body and can be used for securing to a vehicle body, the trim panel securing portion is disposed on one end of fastener body opposite to the vehicle securing portion and can be used for securing to vehicle accessories, and the elastic member securing portion is disposed between the vehicle securing portion and the trim panel securing portion and connects the vehicle securing portion with the trim panel securing portion. The fastener according to the present disclosure can withstand high stress and is in two-level connection with the vehicle accessories, so that the vehicle accessories can be secured when an airbag(s) is not deployed, and the range of movement of the vehicle accessories can also be limited by means of the connection of an elastic member when the airbag(s) is deployed.

20 Claims, 13 Drawing Sheets

(56) References Cited

U.S. PATENT DOCUMENTS

| | | | |
|---|---|---|---|
| 2013/0183089 A1* | 7/2013 | Podsadny | F16B 21/09 403/376 |
| 2015/0300388 A1* | 10/2015 | Maschat | F16B 2/243 24/458 |
| 2016/0229368 A1* | 8/2016 | Dickinson | B60R 21/216 |
| 2020/0116177 A1* | 4/2020 | Binkert | F16B 21/086 |
| 2020/0392973 A1* | 12/2020 | Ammann | F16B 5/0642 |
| 2022/0228611 A1* | 7/2022 | Cobacho | F16B 5/0642 |
| 2022/0243748 A1* | 8/2022 | Murphy | F16B 21/075 |
| 2024/0060522 A1* | 2/2024 | Ribes Martí | F16B 21/075 |

\* cited by examiner

A — A

FASTENER

RELATED APPLICATION(S)

The present application claims the benefit of Chinese Patent Application Nos. 2022112041420, filed Sep. 29, 2022, and 2023110559463, filed Aug. 21, 2023, each titled "Fastener," the contents of which are hereby incorporated by reference.

TECHNICAL FIELD

The present disclosure relates to the technical field of vehicle components, and in particular to a fastener for securing vehicle accessories.

BACKGROUND

Airbags inside a vehicle compartment inflate when activated, so that a vehicle inner trim panel will be ejected. It is necessary to provide a fastener to limit the range of movement of the inner trim panel, so as to avoid accidental injury to a driver or a passenger by the ejected inner trim panel.

The currently used fasteners are buckles made of plastic, which cannot withstand the impact of high explosive force. As the size of an air curtain increases, the size of an airbag explosive device also increases accordingly, resulting in greater explosive force. However, the plastic buckle is prone to breakage under high stress or low temperature conditions, making it impossible for the buckle to pull the inner trim panel, leading to a safety risk.

In addition, the currently used buckles are connected to the vehicle inner trim panel by means of a plastic anchor member. At the moment when an airbag is deployed, the violent collision of the plastic anchor member to the inner trim panel may cause the anchor member of the buckle or the inner trim panel to break, so that the inner trim panel may break away from the buckle to cause a safety risk.

It is necessary to provide a buckle or a fastener, by which when the airbag is not deployed, the inner trim panel can be secured to a metal plate inside the vehicle compartment; and when the airbag is deployed, the inner trim panel can break away from a portion of the fastener and move a certain distance so as to release the airbag, while the other portion of the fastener is still connected to the inner trim panel such that the inner trim panel cannot be completely separated from the fastener, thereby avoiding accidents.

SUMMARY

The present disclosure relates generally to a fastener, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1A:
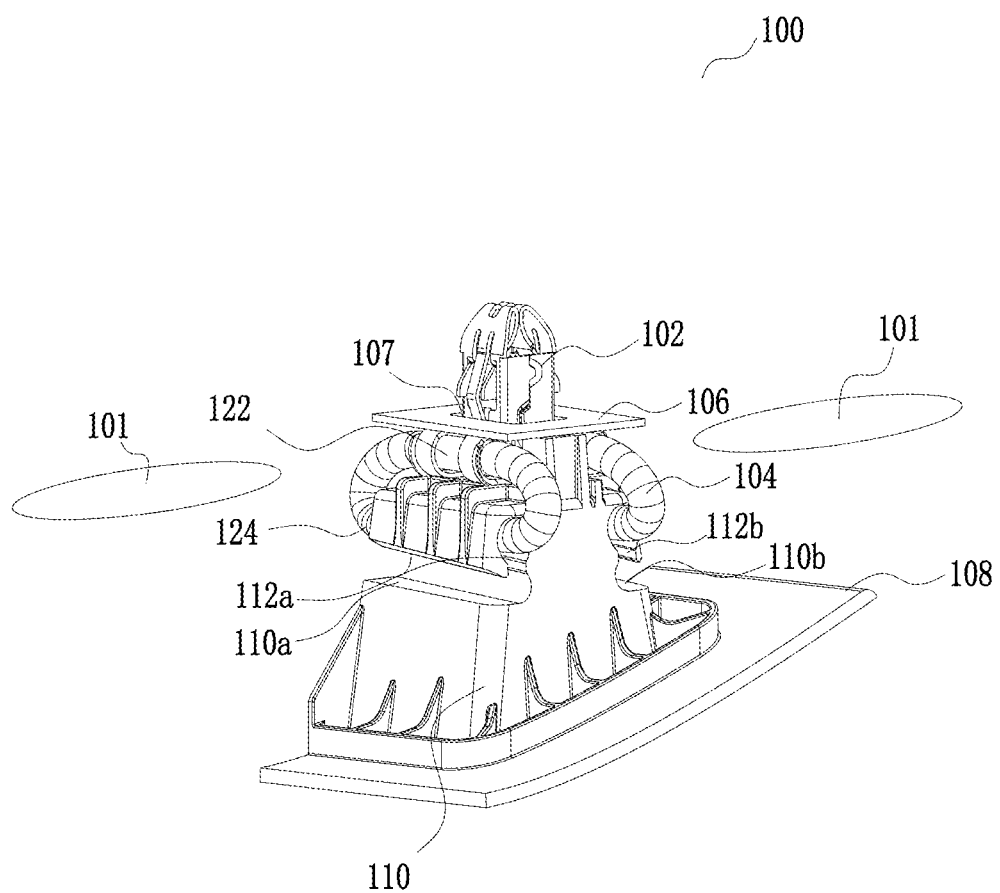
FIG. 1A is a schematic diagram of a first embodiment of a fastener of the present disclosure in a mounted state when airbag(s) is not deployed.

Various specific embodiments of the present disclosure will be described below with reference to the accompanying drawings which constitute part of the present disclosure, but the embodiment would not limit the scope of the present disclosure. It should be understood that although the terms such as "front", "rear", "upper", "lower", "left", "right" and so on indicating directions are used in the present disclosure to describe orientations of various illustrative structural parts and elements in the present disclosure, the terms used herein are merely used for ease of description and are determined based on the illustrative orientation shown in the accompanying drawings. Since the embodiments disclosed in the present disclosure can be arranged in different orientations, the terms indicating directions are merely illustrative and should not be considered as limitations. In addition, the terms "first", "second", etc. used in the present disclosure are merely used to distinguish different objects, instead of indicating that there is any particular sequential relationship between these objects. The term "comprise/include" and derivatives thereof mean inclusion without limitation. Unless otherwise specified and limited, the terms "mounting", "connecting" and "connection" should be understood broadly. For example, they may be mechanical or electrical connection, internal communication between two elements, or direct connection or indirect connection via an intermediate medium. For those of ordinary skills in the art, the specific meanings of the above terms can be understood according to specific cases. If possible, the same or similar reference numerals used in the present disclosure refer to the same components.

According to a first aspect of the present disclosure, a fastener is provided, characterized in that the fastener includes: a fastener body including a vehicle securing portion which is disposed on one end of the fastener body and can be used for securing to a vehicle body; a trim panel securing portion disposed on one end of the fastener body opposite to the vehicle securing portion and used for securing to vehicle accessories; and an elastic member securing portion disposed between the vehicle securing portion and the trim panel securing portion and connecting the vehicle securing portion with the trim panel securing portion.

According to the first aspect of the present disclosure, the fastener is characterized in that the elastic member securing portion includes at least one engaging member which can be used for connecting with at least one rope.

According to the first aspect of the present disclosure, the fastener is characterized in that the at least one engaging member is two engaging members symmetrically disposed with respect to the elastic member securing portion.

According to the first aspect of the present disclosure, the fastener is characterized in that the at least one engaging member is a sleeve-shaped engaging member provided with openings on two ends thereof, wherein the sleeve-shaped engaging member is configured to enable the rope to enter the opening on one end of the sleeve-shaped engaging member and exit the opening on the other end of the sleeve-shaped engaging member.

According to the first aspect of the present disclosure, the fastener is characterized in that the at least one engaging member includes a first sleeve-shaped engaging member and a second sleeve-shaped engaging member, the first sleeve-shaped engaging member being formed by extending a first side of the elastic member securing portion, the second sleeve-shaped engaging member being formed by extending a second side of the elastic member securing portion that is opposite to the first side.

According to the first aspect of the present disclosure, the fastener is characterized in that the elastic member securing portion includes rope retaining portions, the rope retaining portions being formed by bending upwardly from a third side and a fourth side of the elastic member securing portion adjacent to the first side and the second side, the rope retaining portions being positioned on inner sides of the first sleeve-shaped engaging member and the second sleeve-shaped engaging member with respect to the elastic member securing portion, and the rope retaining portions being configured to prevent the rope from laterally moving within the elastic member securing portion.

According to the first aspect of the present disclosure, the fastener is characterized in that the elastic member securing portion includes a first anti-cutting member, the first anti-cutting member being formed by bending partially or wholly the edges of the openings on the two ends of the first sleeve-shaped engaging member in an outward manner, and the first anti-cutting member being configured to prevent the edges of the openings on the two ends of the first sleeve-shaped engaging member from cutting the rope; and the elastic member securing portion further includes a second anti-cutting member, the second anti-cutting member being formed by bending partially or wholly the edges of the openings on the two ends of the second sleeve-shaped engaging member in an outward manner, and the second anti-cutting member being configured to prevent the edges of the openings on the two ends of the second sleeve-shaped engaging member from cutting the rope.

According to the first aspect of the present disclosure, the fastener is characterized in that the vehicle securing portion includes two opposite securing sides and two opposite reinforcement sides, the two opposite securing sides and the two opposite reinforcement sides being adjacent to each other.

According to the first aspect of the present disclosure, the fastener is characterized in that the vehicle securing portion includes vehicle securing legs which are formed by extending downwardly and outwardly from middle portions of upper outside portions of the two opposite securing sides, wherein the vehicle securing legs includes upslope portions and downslope portions.

According to the first aspect of the present disclosure, the fastener is characterized in that the vehicle securing portion includes wedge-shaped stops located on the two opposite securing sides; and the vehicle securing portion further includes bending portions, the bending portions being formed by extending downwardly and inwardly from two side portions of the upper outside portions of the two opposite securing sides, and the bending portions being configured to abut upper surfaces of the wedge-shaped stops, for preventing the wedge-shaped stops from sliding when subjected to an upwardly applied force.

According to the first aspect of the present disclosure, the fastener is characterized in that the vehicle securing portion further includes stop-unlock portions, the stop-unlock portions being connected with the wedge-shaped stops, and the stop-unlock portions being configured to, when subjected to inwardly applied force, drive the wedge-shaped stops to retract inwardly.

According to the first aspect of the present disclosure, the fastener is characterized in that the vehicle securing portion further includes reinforcement portions, the reinforcement portions being formed by bending the two opposite securing sides towards the two opposite reinforcement sides, and the reinforcement portions being configured to be serrated structures for increasing strength of the fastener body.

According to the first aspect of the present disclosure, the fastener is characterized in that the trim panel securing portion includes trim panel securing legs, which are formed by extending upwardly and outwardly from lower portions of the opposite two sides of the trim panel securing portion for securing a vehicle inner trim panel.

According to the first aspect of the present disclosure, the fastener is characterized in that the fastener body is made of high-carbon steel.

According to the first aspect of the present disclosure, the fastener is characterized in that the fastener body is integrally formed.

According to the first aspect of the present disclosure, the fastener is characterized in that the fastener further includes at least one elastic rope, wherein the at least one elastic rope is connected with the at least one engaging member on the elastic member securing portion.

According to the first aspect of the present disclosure, the fastener is characterized in that the at least one elastic rope is connected at two ends thereof to form loop configuration, and the at least one elastic rope is configured to extend through the at least one engaging member on the elastic member securing portion so as to connect with the elastic member securing portion.

According to the first aspect of the present disclosure, the fastener is characterized in that the at least one elastic rope includes a first elastic rope and a second elastic rope, the first elastic rope being connected at two ends thereof to form loop configuration, the second elastic rope being connected at two ends thereof to form loop configuration, and the first elastic rope and the second elastic rope being respectively configured to extend through each one of the at least one engaging member on the elastic member securing portion so as to connect with the elastic member securing portion.

According to the first aspect of the present disclosure, the fastener is characterized in that the first elastic rope is configured to extend through the first sleeve-shaped engaging member, and the second elastic rope is configured to extend through the second sleeve-shaped engaging member.

According to the first aspect of the present disclosure, the fastener is characterized in that the inner portion of the at least one elastic rope is made of an elastic rubber material.

According to the first aspect of the present disclosure, the fastener is characterized in that the vehicle accessories include the vehicle inner trim panel which is provided with a securing member holder, wherein the securing member holder includes a first side and a second side, the first side of the securing member holder including a first securing groove which is capable of partially receiving the first elastic rope to connect the first elastic rope to the first securing groove, and the second side of the securing member holder including a second securing groove which is capable of partially receiving the second elastic rope to connect the second elastic rope to the second securing groove.

According to the first aspect of the present disclosure, the fastener is characterized in that the elastic member securing portion has a folded structure protruding from the vehicle securing portion towards the outside of the fastener body to enable the folded structure to abut the elastic member.

According to the first aspect of the present disclosure, the fastener is characterized in that the elastic member is an elastic strap configured to connect the fastener body and the vehicle accessories together.

According to the first aspect of the present disclosure, the fastener is characterized in that the elastic strap is configured to be fixed between the vehicle body and the folded structure of the elastic member securing portion.

According to the first aspect of the present disclosure, the fastener is characterized in that the elastic strap has a loop configuration, an upper side of the loop configuration abuts an upper surface of the folded structure, and a lower side of the loop configuration is connected with the vehicle accessories.

According to the first aspect of the present disclosure, the fastener is characterized in that the upper side of the loop configuration has an elastic strap opening configured such that the vehicle securing portion extends through the elastic strap opening to allow the upper side of the loop configuration to sleeve over the fastener body and abut the upper surface of the folded structure.

According to the first aspect of the present disclosure, the fastener is characterized in that the vehicle accessories are provided with an elastic strap connecting portion, the elastic strap has an elastic strap first end and an elastic strap second end, wherein a portion of the elastic strap between the elastic strap first end and the elastic strap second end extends through the elastic strap connecting portion so as to connect with the vehicle accessories, the elastic strap first end has an elastic strap first opening configured such that the vehicle securing portion extends through the elastic strap first opening to allow the elastic strap first end to sleeve over the fastener body and abut the upper surface of the folded structure, and the elastic strap second end has an elastic strap second opening configured such that the vehicle securing portion extends through the elastic strap second opening to allow the elastic strap second end to sleeve over the fastener body and abut above the elastic strap first end.

According to the first aspect of the present disclosure, the fastener is characterized in that the folded structure of the elastic member securing portion is configured to be elastically deformable when subjected to an external force so as to buffer the external force.

According to a second aspect of the present disclosure, a fastener is provided, characterized in that the fastener includes: a fastener body, a first elastic rope and a second elastic rope, the fastener body includes: a vehicle securing portion, a trim panel securing portion and an elastic member securing portion, wherein the vehicle securing portion is disposed on one end of the fastener body and can be used for securing to a vehicle body, the trim panel securing portion is disposed on one end of the fastener body opposite to the vehicle securing portion and can be used for securing to vehicle accessories, and the elastic member securing portion is disposed between the vehicle securing portion and the trim panel securing portion and connects the vehicle securing portion with the trim panel securing portion, wherein the elastic member securing portion includes a first sleeve-shaped engaging member and a second sleeve-shaped engaging member, and wherein the first elastic rope being connected at two ends thereof to form loop configuration, and the second elastic rope being connected at two ends thereof to form loop configuration, wherein the first elastic rope is configured to extend through the first sleeve-shaped engaging member so as to connect with the elastic member securing portion, and the second elastic rope is configured to extend through the second sleeve-shaped engaging member so as to connect with the elastic member securing portion.

According to the second aspect of the present disclosure, the fastener is characterized in that the vehicle securing portion includes vehicle securing legs and wedge-shaped stops, wherein the vehicle securing legs include upslope portions and downslope portions.

According to the second aspect of the present disclosure, the fastener is characterized in that the first elastic rope and the second elastic rope can be used to flexibly connect to the vehicle accessories.

Some of the additional aspects and advantages of the present disclosure will be set forth in the following description, and some will become apparent from the following description, or be learned by practice of the present disclosure.

Figure 1B:
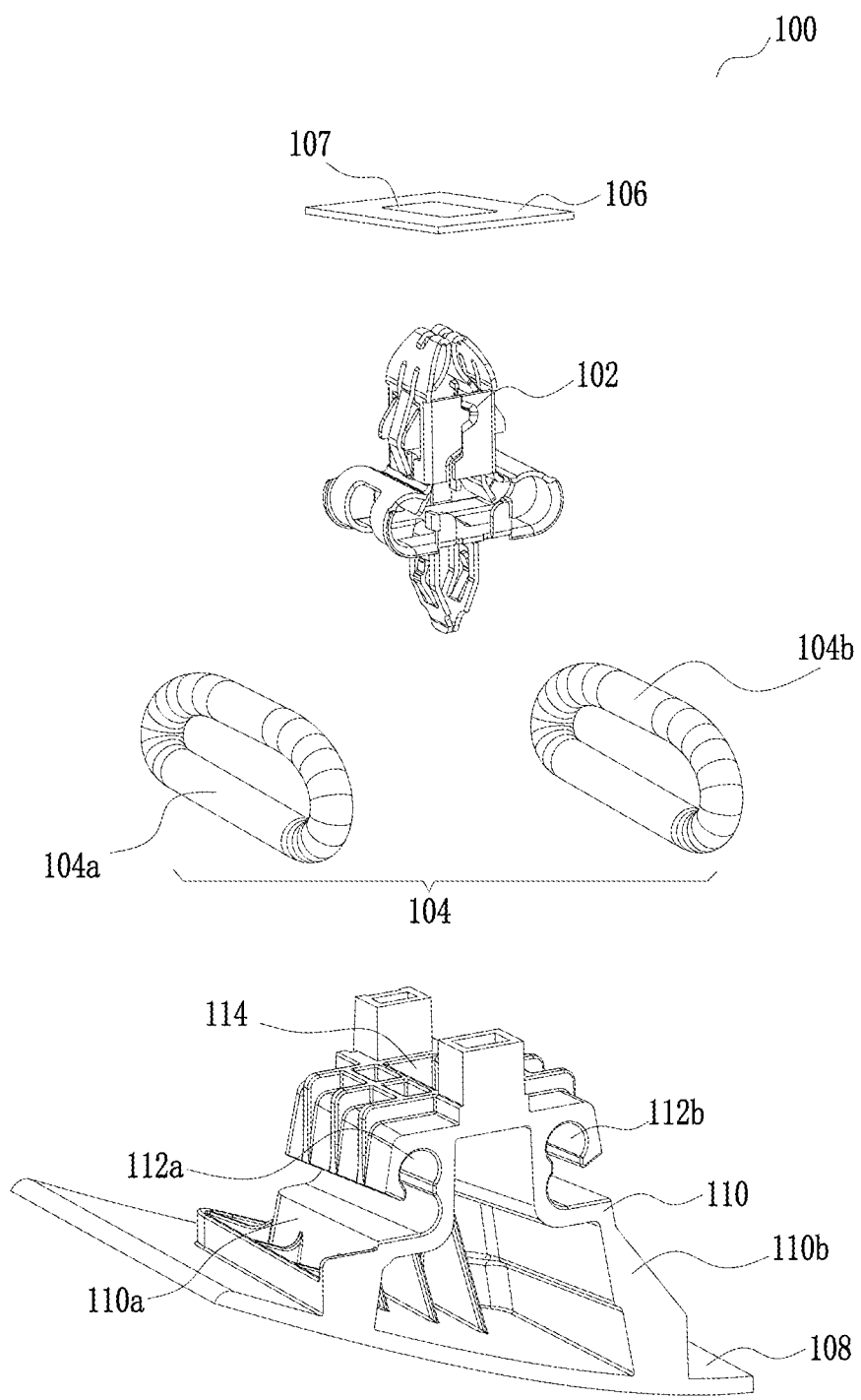
FIG. 1B is an exploded view of the fastener shown in FIG. 1A.

FIGS. 1A and 1B are a schematic diagram of a first embodiment of a fastener of the present disclosure in a mounted state when airbag(s) 101 is not deployed and an exploded view of the fastener.

As shown in FIGS. 1A and 1B, the fastener 100 includes a fastener body 102 and an elastic rope 104 connected with the fastener body 102. Preferably, two elastic ropes 104 are provided, and are arranged symmetrically to improve the stability of connection between the elastic ropes 104 and the vehicle accessories. The fastener body 102 is made of high-carbon steel, and has certain elasticity after thermal treatment. The inner portions of the two elastic ropes 104 are made of an elastic rubber material, and the outer portions thereof are formed by means of fabric weaving.

Each of the two elastic ropes 104 is connected at two ends thereof to form a loop configuration which includes an upper side 122 and a lower side 124. As shown in FIG. 1A, the upper sides 122a, 122b of the two elastic ropes 104 are connected with the fastener body 102, and the lower sides 124a, 124b of the two elastic ropes 104 are flexibly connected with a vehicle inner trim panel 108. A portion of the fastener body 102 may be inserted into a securing hole 107 in a vehicle interior metal plate 106 and then secured to the metal plate 106. Another portion of the fastener body 102 may also be inserted into a securing hole 114 in a securing member holder 110 of the vehicle inner trim panel 108, so as to secure the vehicle inner trim panel 108 to the vehicle interior metal plate 106.

The securing member holder 110 of the vehicle inner trim panel 108 has a first side 110a and a second side 110b. The upper portion of the first side 110a is provided with a first securing groove 112a for partially receiving a first elastic rope 104a in the two elastic ropes 104. Similarly, the upper portion of the second side 110b is provided with a second securing groove 112b for partially receiving a second elastic rope 104b in the two elastic ropes 104. In this way, the first elastic rope 104a and the second elastic rope 104b may be flexibly connected with the vehicle inner trim panel 108 via the first securing groove 112a and the second securing groove 112b.

With continuing reference to FIG. 1A, the airbag(s) 101 is disposed in a space between the vehicle inner trim panel 108 and the vehicle interior metal plate 106. When the airbag(s) 101 is not inflated and deployed, a portion of the fastener body 102 is held in the securing hole 107 of the vehicle interior metal plate 106, and another portion of the fastener body 102 is held in the securing hole 114 of the securing member holder 110 of the vehicle inner trim panel 108, so that the fastener body 102 is secured to both the metal plate 106 and the vehicle inner trim panel 108. When the airbag(s) 101 is not inflated and deployed, the first elastic rope 104a and the second elastic rope 104b are in an unstretched state and connect the fastener body 102 and the vehicle inner trim panel 108 together.

In some other embodiments, the number of the elastic rope 104 may not be two. For example, one or more than two elastic ropes 104 may be provided in the fastener 100 of the present disclosure and arranged in a symmetrical manner to connect the fastener body 102 and the vehicle inner trim panel 108 together.

In some other embodiments, the fastener body 102 may also be made of metal with certain elasticity other than high-carbon steel.

In some other embodiments, inner portions of the elastic ropes 104 may not be completely made of an elastic rubber material. That is, the upper side 122 of the loop configuration of the elastic rope 104 connected with the fastener body 102 and the lower side 124 of the loop configuration of the elastic rope 104 connected with the securing member holder 110 may be made of a non-elastic material, and the other parts of the elastic rope 104 may be made of an elastic rubber material.

In some other embodiments, the elastic rope 104 may not be of loop configuration. That is, the elastic rope 104 is not connected at two ends thereof. For example, the elastic rope 104 is connected to the fastener body 102 at one end, and connected to the vehicle inner trim panel 108 at the other end, so as to connect the fastener body 102 and the vehicle inner trim panel 108 together.

Figure 2A:
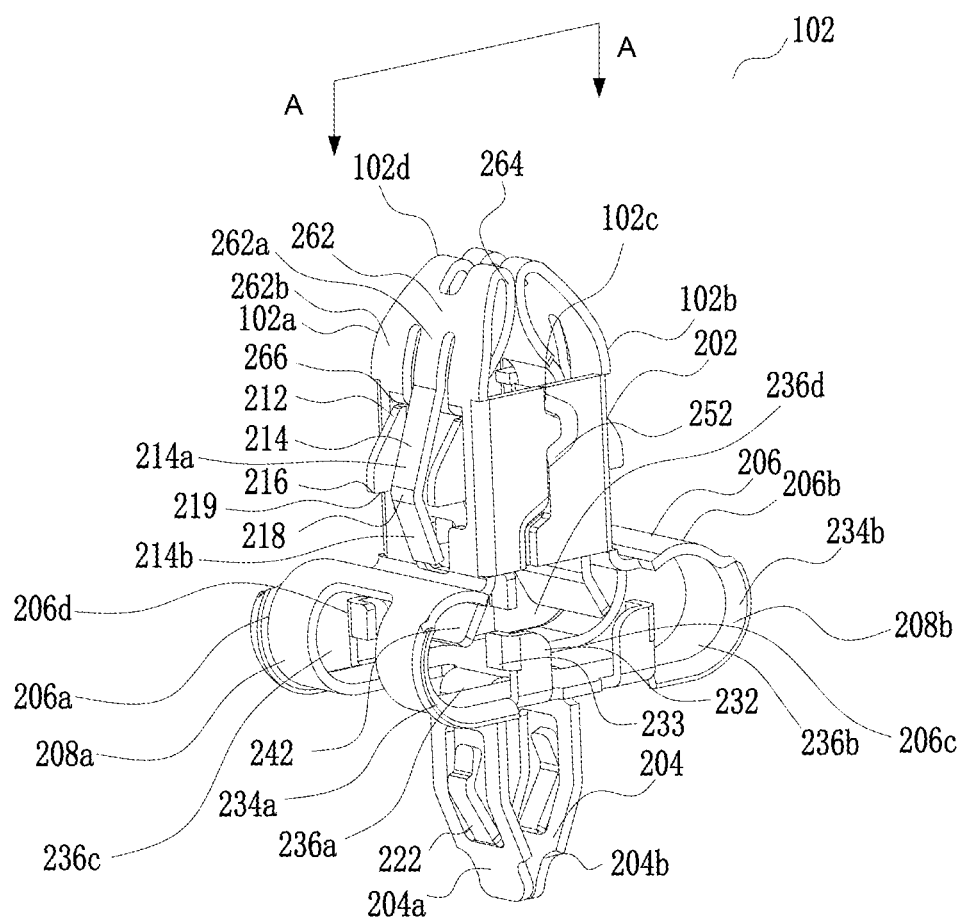
FIG. 2A is a perspective view of a fastener body shown in FIGS. 1A and 1B.
Figure 2B:
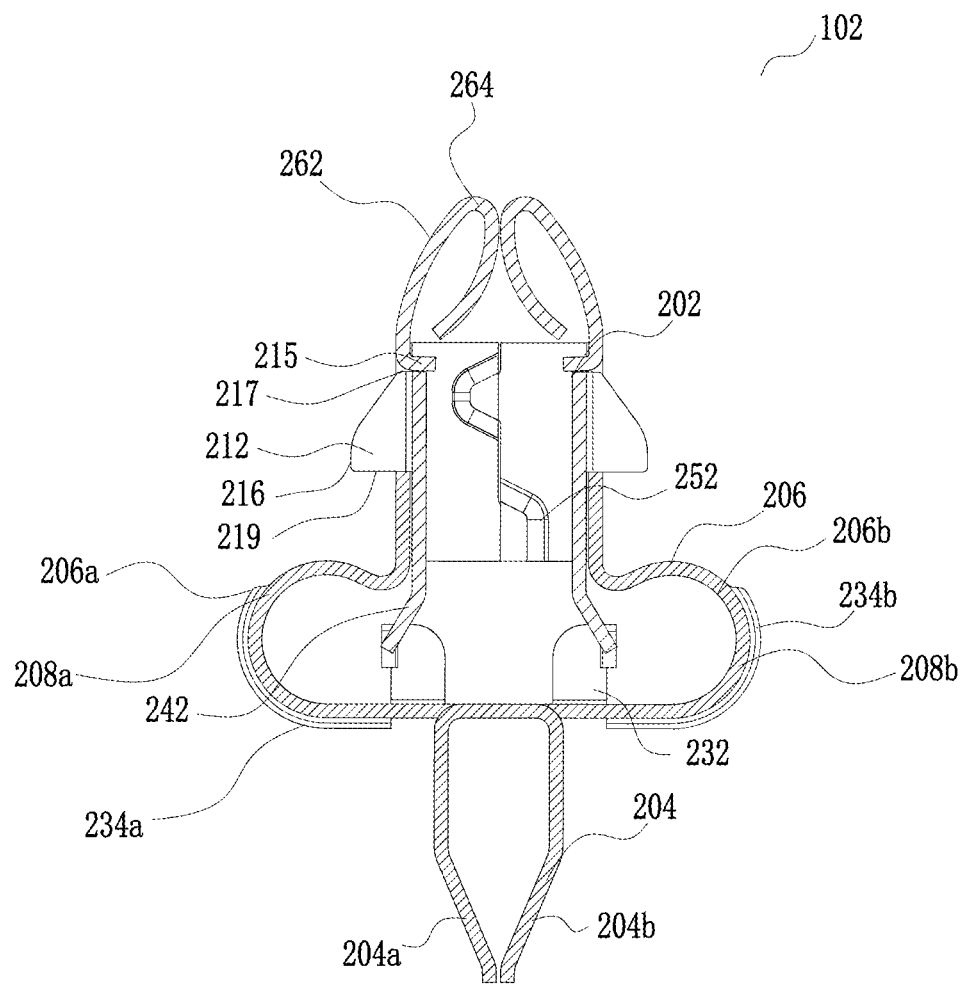
FIG. 2B is a cross-sectional view of the fastener body shown in FIG. 2A along line A-A.
Figure 2C:
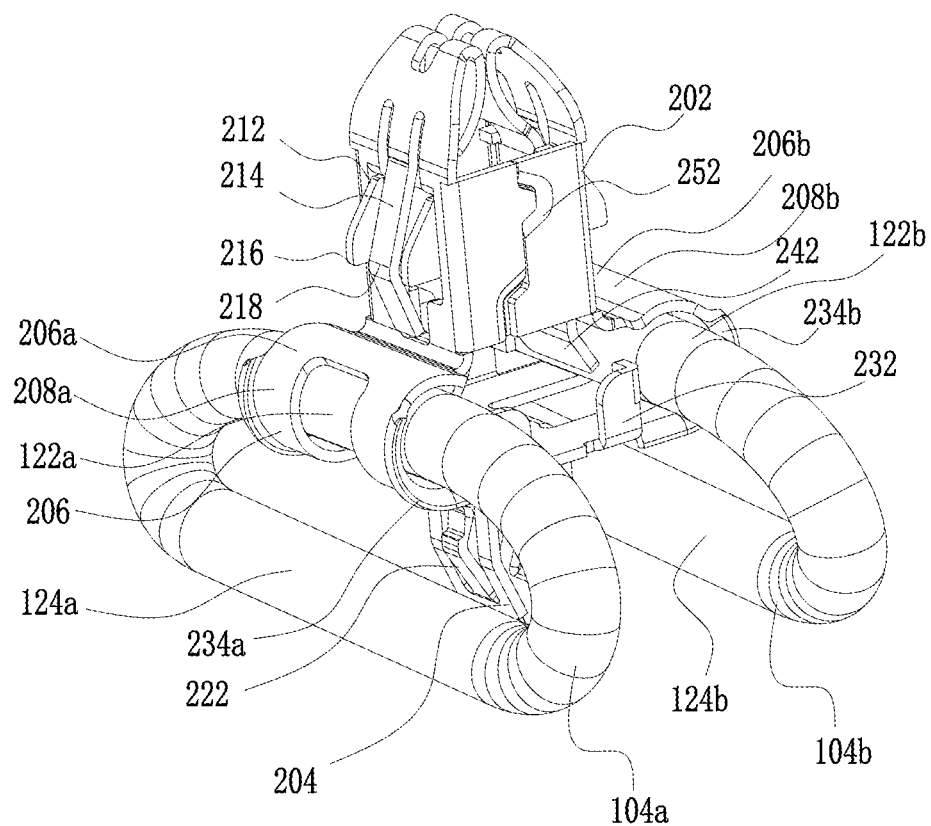
FIG. 2C is a perspective schematic diagram of the fastener body in the first embodiment of the fastener of the present disclosure in an assembled state with elastic ropes 104.

FIGS. 2A and 2B are a perspective view and a cross-sectional view of the fastener body 102 shown in FIGS. 1A and 1B. FIG. 2A is a perspective view of the fastener body 102 shown in FIGS. 1A and 1B. FIG. 2B is a cross-sectional view of the fastener body 102 shown in FIG. 2A along line A-A. FIG. 2C is a perspective schematic diagram of the fastener body 102 in the first embodiment of the fastener of the present disclosure in an assembled state with elastic ropes 104.

As shown in FIGS. 2A and 2B, the fastener body 102 is integrally formed by stamping, and may be of a symmetrical structure in front-and-rear and left-and-right directions. The fastener body 102 includes a vehicle securing portion 202, a trim panel securing portion 204, and an elastic member securing portion 206 disposed between the vehicle securing portion 202 and the trim panel securing portion 204.

With continuing reference to FIGS. 2A and 2B, the vehicle securing portion 202 is disposed on the upper portion of the fastener body 102, and can be used for securing to the vehicle interior metal plate 106. The vehicle securing portion 202 includes two opposite securing sides 102a, 102b and two opposite reinforcement sides 102c, 102d, the two opposite securing sides 102a, 102b and the two opposite reinforcement sides 102c, 102d being adjacent to each other. The vehicle securing portion 202 includes vehicle securing legs 214, wedge-shaped stops 212, bending portions 215, stop-unlock portions 242 and reinforcement portions 252.

With continuing reference to FIGS. 2A and 2B, the vehicle securing legs 214 are formed by extending downwardly and outwardly from middle portions 262a of upper outside portions 262 of the two opposite securing sides 102a, 102b, such that the vehicle securing legs 214 protrude towards outer sides of the two opposite securing sides 102a, 102b, and the bending portions 215 are formed by extending downwardly and inwardly from two side portions 262b of the upper outside portions 262 of the two opposite securing sides 102a, 102b, which will be describe in detail below.

The vehicle securing legs 214 include upslope portions 214a, downslope portions 214b, and connecting portions 218 connecting the upslope portions 214a with the downslope portions 214b. The connecting portions 218 are the outermost positions of the vehicle securing legs 214 protruding outwardly. The upslope portions 214a are formed by extending downwardly and outwardly from the middle portions 262a of the upper outside portions 262 of the two opposite securing sides 102a, 102b, and the downslope portions 214b are formed by extending downwardly and inwardly from the connecting portions 218.

In this embodiment, the two opposite securing sides 102a, 102b of the fastener body 102 each include at least one vehicle securing leg 214, and the distance between the outermost positions of the corresponding connecting portions 218 protruding outwardly is greater than the hole size of the securing hole 107 in the vehicle interior metal plate 106.

When the fastener body 102 is inserted into the securing hole 107 in the vehicle interior metal plate 106, the upslope portions 214a of the vehicle securing legs 214 first come into contact with edges of the securing hole 107. As the fastener body 102 is inserted, the upslope portions 214a of the vehicle securing legs 214 are gradually pressed inwardly, and when the insertion proceeds until the connecting portions 218 of the vehicle securing legs 214 come into contact with the edges of the securing hole 107, the vehicle securing legs 214 are pressed inwardly to an innermost position. Once the connecting portions 218 of the vehicle securing legs 214 enter the securing hole 107, with the downslope portions 214b of the vehicle securing legs 214 coming into contact with the edges of the securing hole 107, the vehicle securing legs 214 are pressed inwardly to the innermost position and then rebound outwardly. As the fastener body 102 continues to be inserted, the vehicle securing legs 214 continue to rebound outwardly and, in a final inserted state, abut the edges of the securing hole 107 by means of the downslope portions 214b. Since the vehicle securing legs 214 abut the edges of the securing hole 107 by means of inclined downslope portions 214b thereof, the securing hole 107 is allowed to have a certain range of manufacturing tolerances during manufacturing, which is beneficial to securing of the fastener body 102 to the metal plate 106.

With continuing reference to FIGS. 2A and 2B, the wedge-shaped stops 212 are formed by extending downwardly and inwardly from upper inside portions 264 of the two opposite securing sides 102a, 102b. Specifically, two side portions extending downwardly and inwardly from the upper inside portions 264 are bent outwardly, and protrude outwardly through the openings 266 on the two opposite securing sides 102a, 102b, so as to form the wedge-shaped stops 212. The middle portions between the two side portions of the upper inside portions 264 continue to extend downwardly to form the stop-unlock portions 242, which will be described in detail below.

The outwardly protruding wedge-shaped portions of the wedge-shaped stops 212 gradually increase in size from top to bottom, and the outermost protruding portions of the wedge-shaped stops 212 form stop features 216 which abut an inner side surface of the vehicle interior metal plate 106 under high impact force to prevent the fastener body 102 from disengaging from the securing hole 107.

In this embodiment, the two opposite securing sides 102a, 102b of the fastener body 102 each include at least one wedge-shaped stop 212, and the distance between the outermost portions of the corresponding stop features 216 is greater than the hole size of the securing hole 107 in the vehicle interior metal plate 106.

When the fastener body 102 is inserted into the securing hole 107 in the vehicle interior metal plate 106, the upper end portions of the wedge-shaped stops 212, which are less protruding outwardly, first come into contact with the edges of the securing hole 107. As the fastener body 102 is inserted, since the outwardly protruding portions of the wedge-shaped stops 212 gradually increase in size, the wedge-shaped stops 212 are gradually pressed inwardly. When the stop features 216 of the wedge-shaped stops 212 come into contact with the edges of the securing hole 107, the wedge-shaped stops 212 are pressed inwardly to the innermost position. Once the stop features 216 of the wedge-shaped stops 212 enter the securing hole 107, the wedge-shaped stops 212 will rebound outwardly to the original state thereof, so that lower surfaces 219 of the stop features 216 may abut the inner side surface of the metal plate 106 under high impact force to prevent the fastener body 102 from disengaging from the securing hole 107.

As shown in FIG. 2B and described below, the bending portions 215 are formed by extending downwardly and inwardly from the two side portions 262b of the upper outside portions 262 of the two opposite securing sides 102a, 102b. The bending portions 215 are configured to abut the upper surfaces 217 of the wedge-shaped stops 212, for preventing the fastener body 102 from breaking away from the securing to the metal plate 106 due to the lower surfaces 219 of the stop features 216 of the wedge-shaped stops 212 disengaging from the securing hole 107 of the metal plate 106, which disengagement is caused by the upward and inward sliding of wedge-shaped stops 212 due to the material deformation of the upper inside portions 264, when they are subjected to upwardly applied force.

As described above, the stop-unlock portions 242 are formed by further extending downwardly from the middle portions between the two side portions that extend downwardly and inwardly from the upper inside portions 264 of the two opposite securing sides 102a, 102b. Since both the stop-unlock portions 242 and the wedge-shaped stops 212 are formed by the material extending downwardly and inwardly from the upper inside portions 264, when an inwardly deflecting force is applied, the stop-unlock portions 242 drive the wedge-shaped stops 212 to deflect and retract inwardly so as to make the stop features 216 of the wedge-shaped stops 212 retracted into an internal space of the vehicle securing portion 202, so that the fastener body 102 can be pulled out of the securing hole 107 of the metal plate 106 by means of the vehicle securing legs 214 deflecting inwardly.

With continuing reference to FIGS. 2A and 2B, the reinforcement portions 252 are formed by the two opposite securing sides 102a, 102b bending towards the two opposite reinforcement sides 102c, 102d. The reinforcement portions 252 are serrated structures for increasing strength of the fastener body 102. In some other embodiments, the reinforcement portions 252 may also be other concave-convex structures which can be used for reinforcement.

As shown in FIGS. 2A to 2C, the elastic member securing portion 206 is disposed between the vehicle securing portion 202 and the trim panel securing portion 204 for connecting with the elastic ropes 104. The elastic member securing portion 206 includes a first side 206a and a second side 206b opposite to each other, and a third side 206c and a fourth side 206d opposite to each other and respectively adjacent to the first side 206a and the second side 206b. The elastic member securing portion 206 includes a first sleeve-shaped engaging member 208a, a second sleeve-shaped engaging member 208b, rope retaining portions 232, a first anti-cutting member 234a and a second anti-cutting member 234b.

With continuing reference to FIGS. 2A to 2C, the first sleeve-shaped engaging member 208a and the second sleeve-shaped engaging member 208b are symmetrically disposed with respect to the elastic member securing portion 206, and respectively formed by extending along the first side 206a and the second side 206b of the elastic member securing portion 206 and bending upwardly and inwardly, for respectively partially receiving the first elastic rope 104a and the second elastic rope 104b. As shown in FIG. 2A, the first sleeve-shaped engaging member 208a and the second sleeve-shaped engaging member 208b are respectively provided with first openings 236a, 236c and second openings 236b, 236d at two ends thereof, the first elastic rope 104a extends through the first openings 236a, 236c to connect with the elastic member securing portion 206, and the second elastic rope 104b extends through the second openings 236b, 236d to connect with the elastic member securing portion 206. Taking the method of connecting and mounting the first elastic rope 104a as an example, the strip-shaped elastic rope 104a sequentially extends through the openings 236a and 236c at two ends of the first sleeve-shaped engaging member 208a and then are partially received in the first sleeve-shaped engaging member 208a, and then the elastic rope 104a partially received in the first sleeve-shaped engaging member 208a is secured at the two ends thereof by means of a clasp so as to form loop configuration of the elastic rope 104a.

With continuing reference to FIG. 2A, the rope retaining portions 232 are formed by bending upwardly the material on the third side 206c and the fourth side 206d of the elastic member securing portion 206, and the rope retaining portions 232 are located on the inner sides of the sleeve-shaped engaging members 208a, 208b with respect to the elastic member securing portion 206. The rope retaining portions 232 include retaining walls 233, and each elastic rope 104 may be retained by two rope retaining portions 232. The retaining walls 233 may limit the lateral movement of the elastic ropes 104 in the elastic member securing portion 206. Specifically, when the airbag(s) 101 is deployed, the vehicle inner trim panel 108 and the securing member holder 110 thereof will move at high speed in any direction, so that each elastic rope 104 may be subjected to pulling force from the vehicle inner trim panel 108 in any direction, the elastic ropes 104 may have a tendency to move towards the middle of the elastic member securing portion 206 under the action of the pulling force and break away from the receiving of the sleeve-shaped engaging members 208a, 208b, resulting in uneven forces applied to the opposite first side 206a and second side 206b of the elastic member securing portion 206. Therefore, the rope retaining portions 232 may keep the abutment of the retaining walls 233 and the elastic ropes 104 to prevent the elastic ropes 104 from moving laterally from the sleeve-shaped engaging members to the middle of the elastic member securing portion 206, so that the fastener body 102 may also be subjected to relatively uniform pulling forces from the two bilaterally symmetrically disposed elastic ropes 104 when the airbag(s) 101 is deployed.

With continuing reference to FIGS. 2A and 2B, the first anti-cutting member 234a and the second anti-cutting member 234b are respectively formed by bending partially or wholly the edges of the first openings 236a, 236c of the first sleeve-shaped engaging member 208a and the edges of the second openings 236b, 236d of the second sleeve-shaped engaging member 208b in an outward manner, so that the contact areas between the first openings 236a, 236c, the second openings 236b, 236d and the elastic ropes 104 are increased, so as to prevent the edges of the first openings 236a, 236c of the first sleeve-shaped engaging member 208a and the edges of the second openings 236b, 236d of the second sleeve-shaped engaging member 208b from cutting the elastic ropes 104 under the action of large pulling forces.

As shown in FIGS. 2A and 2B, the trim panel securing portion 204 is disposed on the lower portion of the fastener body 102 and can be used for securing to the securing member holder 110 of the vehicle inner trim panel 108. The trim panel securing portion 204 includes two opposite sides 204a, 204b, and further includes trim panel securing legs 222 formed by extending upwardly and outwardly from lower portions of the two opposite sides 204a, 204b. The trim panel securing legs 222 protrude towards the outer sides of the two opposite sides 204a, 204b of the trim panel securing portion 204, and may be inserted into the securing hole 114 in the securing member holder 110 of the vehicle inner trim panel 108, so as to secure the fastener body 102 and the vehicle inner trim panel 108 together.

Figure 3:
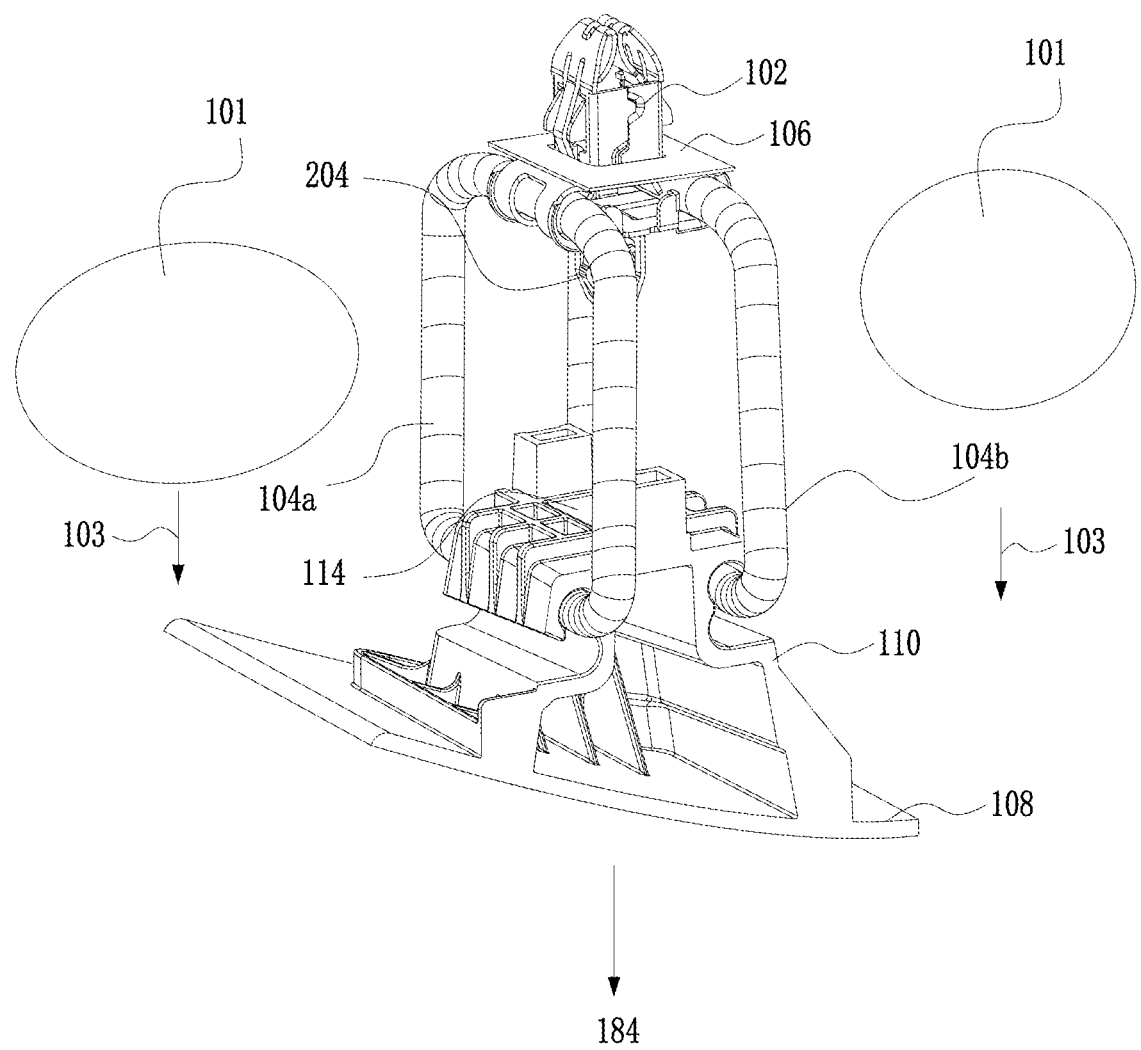
FIG. 3 is a schematic diagram of the first embodiment of the fastener of the present disclosure in a mounted state when the airbag(s) is deployed.

FIG. 3 is a schematic diagram of the first embodiment of the fastener of the present disclosure in a mounted state when the airbag(s) is deployed.

As shown in FIG. 3, when the vehicle collides violently, an inflation device for the airbag(s) 101 is triggered, so that the airbag(s) 101 will be rapidly inflated so as to downwardly exert pressing force on the vehicle inner trim panel 108 in a direction indicted by arrow 103 in FIG. 3. The vehicle inner trim panel 108 breaks away from the securing of the trim panel securing portion 204 of the fastener body 102 under the pressing force mentioned above and moves downwardly at high speed (in the direction indicated by arrow 184), so that a gap is left between the vehicle inner trim panel 108 and the vehicle interior metal plate 106, and then the airbag(s) 101 can be deployed from the gap. As the vehicle inner trim panel 108 moves downwardly, the securing member holder 110 of the vehicle inner trim panel 108 pulls the first elastic rope 104a and the second elastic rope 104b downwardly, so that the first elastic rope 104a and the second elastic rope 104b are elongated under the pulling force.

As an embodiment of the present disclosure, the length of the elastic ropes in a natural state (e.g., an unstretched state shown in FIGS. 1A, 1B and 2C) is 38.1 mm, and the elastic ropes can be stretched up to 100 mm under the pulling force. That is to say, the elastic ropes 104 can limit the movement of the vehicle inner trim panel 108 within the distance range of 100 mm.

The tensile deformation of the elastic ropes 104 allows the vehicle inner trim panel 108 to break away from the fastener body 102 and move a certain distance so that a gap is left for the airbag(s) 101 to deploy, and it can also limit the range of movement of the vehicle inner trim panel 108 so as to prevent the vehicle inner trim panel 108 from breaking away from the limiting of the fastener 100 when the airbag(s) 101 is deployed and thus causing an accident.

Figure 4A:
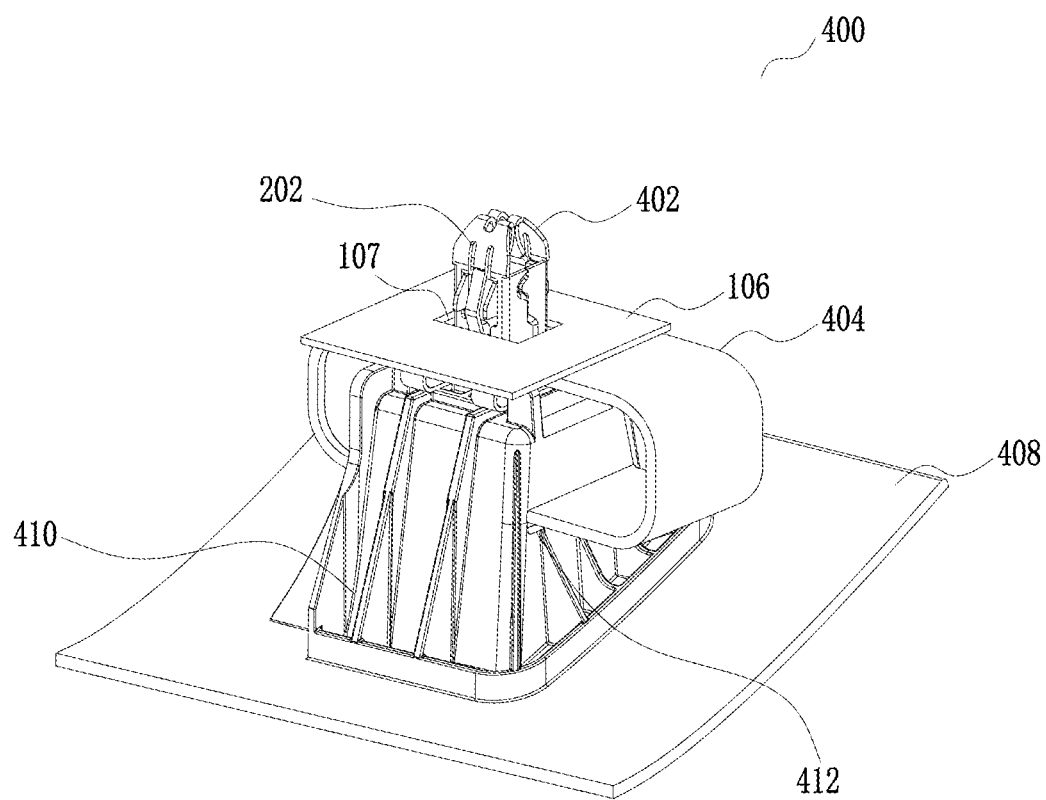
FIG. 4A is a schematic diagram of a second embodiment of the fastener of the present disclosure in a mounted state.
Figure 4B:
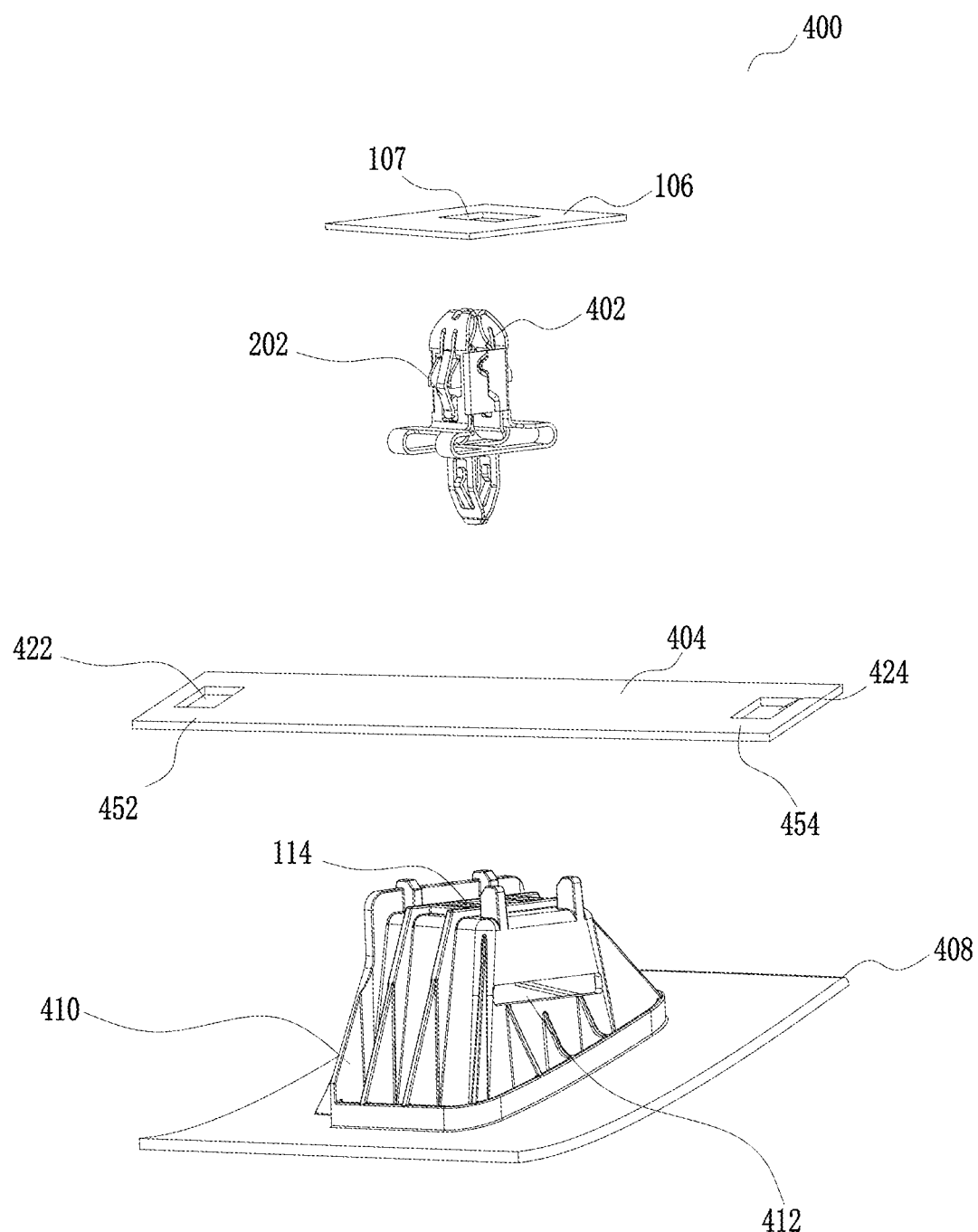
FIG. 4B is an exploded view of the fastener shown in FIG. 4A.

FIGS. 4A and 4B are a schematic diagram of a second embodiment of the fastener of the present disclosure in a mounted state and an exploded view of the same embodiment. The elastic strap 404 shown in FIGS. 4A and 4B is made of an elastic rubber material, and can be bent in any shape. The elastic strap 404 shown in FIG. 4A is in a bent and connected state, and the elastic strap 404 shown in FIG. 4B is in an unfolded and non-connected state.

As shown in FIGS. 4A and 4B, compared with the method in the first embodiment of connecting the fastener body 102 and the vehicle inner trim panel 108 together by means of the two elastic ropes 104, in the second embodiment of the present disclosure, the fastener body 402 and the vehicle inner trim panel 408 are connected together by means of the flat elastic strap 404 in loop configuration. The main difference between the second embodiment and the first embodiment lies in that the elastic strap 404 is connected with the fastener body 402 and the vehicle inner trim panel 408 in a different way.

Continuing as shown in FIGS. 4A and 4B, the vehicle inner trim panel 408 in the second embodiment of the present disclosure has substantially the same structure as the vehicle inner trim panel 108 in the first embodiment, the difference lies in that the portion of the securing member holder 410 connected with the elastic strap 404 is different from that of the securing member holder 110, and the portions with the same structure will not be described again. In the second embodiment, the securing member holder 410 is provided with an elastic strap connecting hole 412 that laterally penetrates the securing member holder 410, so that the elastic strap 404 may extend through the elastic strap connecting hole 412 so as to connect with the vehicle inner trim panel 408.

As shown in FIG. 4B, the elastic strap 404 has an elastic strap first end 452 and an elastic strap second end 454, and the portion of the elastic strap 404 between the elastic strap first end 452 and the elastic strap second end 454 can extend through the elastic strap connecting hole 412 so as to connect with the vehicle inner trim panel 408. The elastic strap first end 452 is provided with an elastic strap first opening 422, so that the vehicle securing portion 202 of the fastener body 402 may extend through the elastic strap first opening 422 so as to allow the elastic strap first end 452 to sleeve over the fastener body 402; and the elastic strap second end 454 is provided with an elastic strap second opening 424, so that the vehicle securing portion 202 of the fastener body 402 may extend through the elastic strap second opening 424 so as to allow the elastic strap second end 454 to sleeve over the fastener body 402. After the elastic strap first end 452 and the elastic strap second end 454 are sleeved over the fastener body 402, the vehicle securing portion 202 of the fastener body 402 is inserted into the securing hole 107 in the vehicle interior metal plate 106, so as to secure the elastic strap first end 452 and the elastic strap second end 454 between the vehicle interior metal plate 106 and the fastener body 402. The elastic strap first end 452 and the elastic strap second end 454 of the elastic strap 404 are both sleeved over the fastener body 402, and thus the fastener body 402 and the vehicle inner trim panel 408 are connected together by means of the elastic strap 404 in loop configuration.

Those skilled in the art can understand that, in other embodiments, the elastic strap opening may also be disposed in the middle between two ends of the elastic strap. The elastic strap opening is sleeved over the fastener body, and then the two ends of the elastic strap are connected with the vehicle inner trim panel so as to connect the fastener body and the vehicle inner trim panel together in loop configuration, that is, the upper side of the loop configuration of the elastic strap is connected with the fastener body, and the lower side of the loop configuration of the elastic strap is connected with the vehicle inner trim panel.

Those skilled in the art can understand that, in other embodiments, the fastener body can also be connected with the vehicle inner trim panel in a non-loop connection way. Specifically, the elastic strap opening is disposed on one end of the elastic strap, the one end of the elastic strap having the elastic strap opening is sleeved over the fastener body, and the other end of the elastic strap is connected with the vehicle inner trim panel. One, two or more elastic straps may be provided as required to connect the fastener body with the vehicle inner trim panel.

Figure 5A:
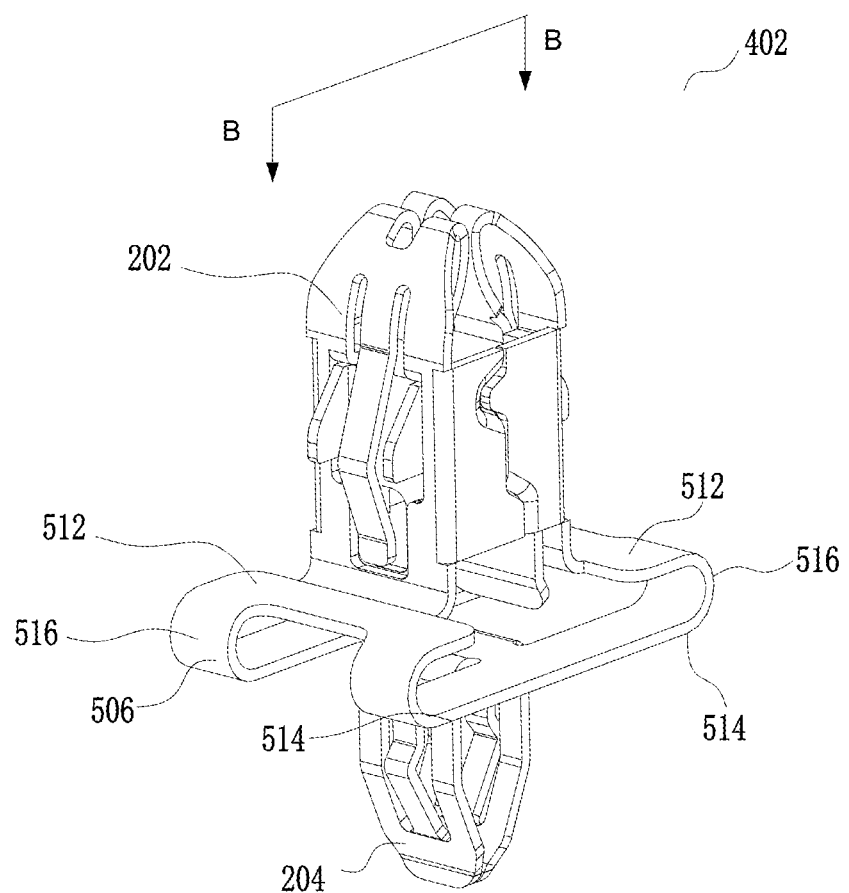
FIG. 5A is a perspective view of a fastener body shown in FIGS. 4A and 4B.
Figures 5B, 5C:
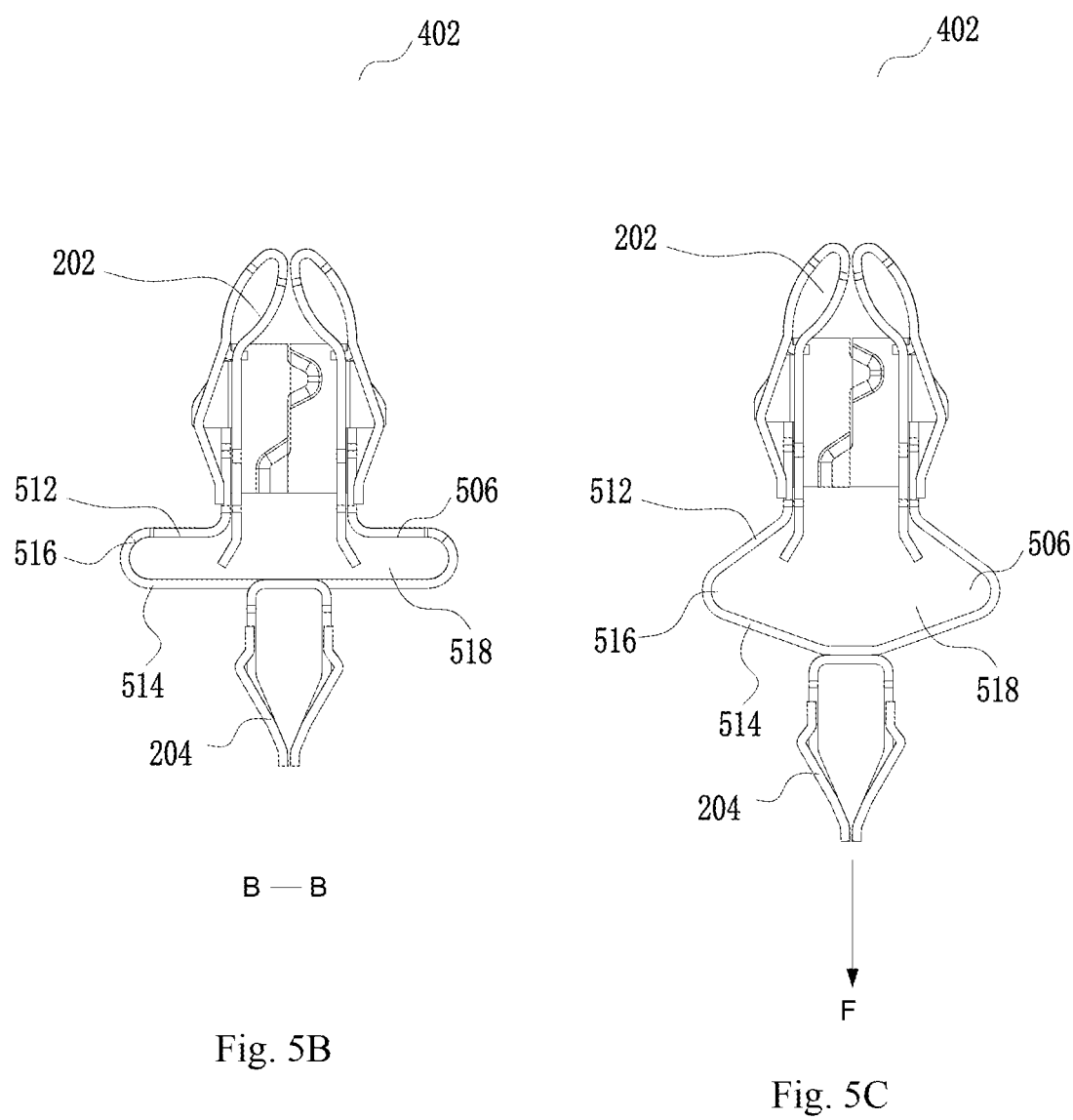
FIG. 5B is a cross-sectional view of the fastener body shown in FIG. 5A along line B-B.
FIG. 5C is a schematic diagram of the fastener body shown in FIG. 5B in a deformed state after subjected to a pulling force F.

FIGS. 5A to 5C show a perspective view and a cross-sectional view of the fastener body 402 shown in FIGS. 4A and 4B. FIG. 5A is a perspective view of a fastener body 402 shown in FIGS. 4A and 4B, FIG. 5B is a cross-sectional view of the fastener body 402 shown in FIG. 5A along line B-B, and FIG. 5C is a schematic diagram of the fastener body 402 shown in FIG. 5B in a deformed state after subjected to a pulling force F.

In the second embodiment of the present disclosure, the fastener body 402 has substantially the same structure as the fastener body 102 in the first embodiment, the main difference in structure lies in that the structures of the elastic member securing portion 506 for securing or connecting the elastic member are different, and the portions with the same structure will not be described again.

As shown in FIG. 5A, since there is no need to receive the elastic rope(s), the elastic member securing portion 506 in the second embodiment is flatter in the longitudinal direction of the fastener body 402 than the elastic member securing portion 206 in the first embodiment, and the rope retaining portions and the anti-cutting members are not provided as that in the first embodiment. Specifically, the elastic member securing portion 506 has an elastic member securing portion upper section 512 and an elastic member securing portion lower section 514 opposite to each other on the side of the fastener body 402, and an elastic member securing portion connecting section 516. The elastic member securing portion upper section 512 is connected with the elastic member securing portion lower section 514 by means of the elastic member securing portion connecting section 516 to form a folded structure of the elastic member securing portion upper section 512 and the elastic member securing portion lower section 514. The folded structure protrudes from the vehicle securing portion 202 towards the outside of the fastener body 402 to enable the elastic strap 404 to abut the upper surface of the elastic member securing portion upper section 512, that is, the elastic strap first end 452 is sleeved over the fastener body 402 and abuts the upper surface of the elastic member securing portion upper section 512, and the elastic strap second end 454 is sleeved over the fastener body 402 and abuts above the elastic strap first end 452. After the elastic strap first end 452 and the elastic strap second end 454 of the elastic strap 404 are sleeved over the vehicle securing portion 202 of the fastener body 402, the vehicle securing portion 202 is inserted into the securing hole 107 in the vehicle interior metal plate 106 so as to secure the elastic strap first end 452 and the elastic strap second end 454 between the vehicle interior metal plate 106 and the upper surface of the elastic member securing portion upper section 512, so that the elastic strap first end 452 and the elastic strap second end 454 attach to each other to form the loop configuration of the elastic strap 404.

As shown in FIGS. 5B and 5C, when the fastener body 402 is subjected to a downward pulling force F from the vehicle inner trim panel, in addition to generating elastic buffering by means of the elastic strap, the elastic member securing portion 506 may also provide secondary buffering by means of elastic or plastic deformation.

Specifically, when the elastic member securing portion 506 is subjected to the pulling force F as shown in FIG. 5C, the folded structure of the elastic member securing portion 506 may be deformed and less folded, and specifically, the elastic member securing portion connecting section 516 is elastically or plastically deformed, so that the distance 518 between the elastic member securing portion upper section 512 and the elastic member securing portion lower section 514 increases, so that the impact force can be partially buffered.

Figure 6A:
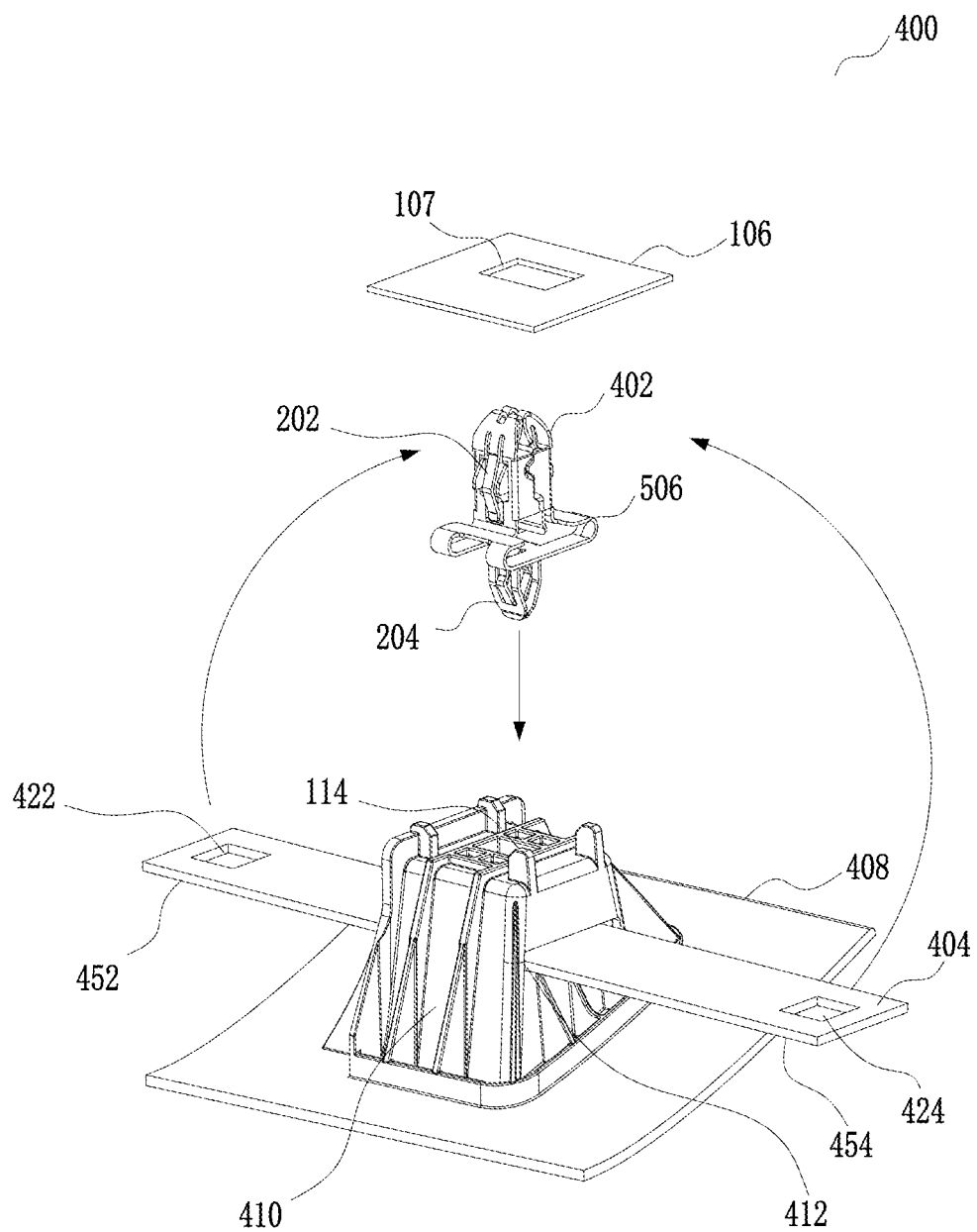
FIG. 6A is a first schematic diagram illustrating an assembly process of the fastener shown in FIG. 4A.
Figure 6B:
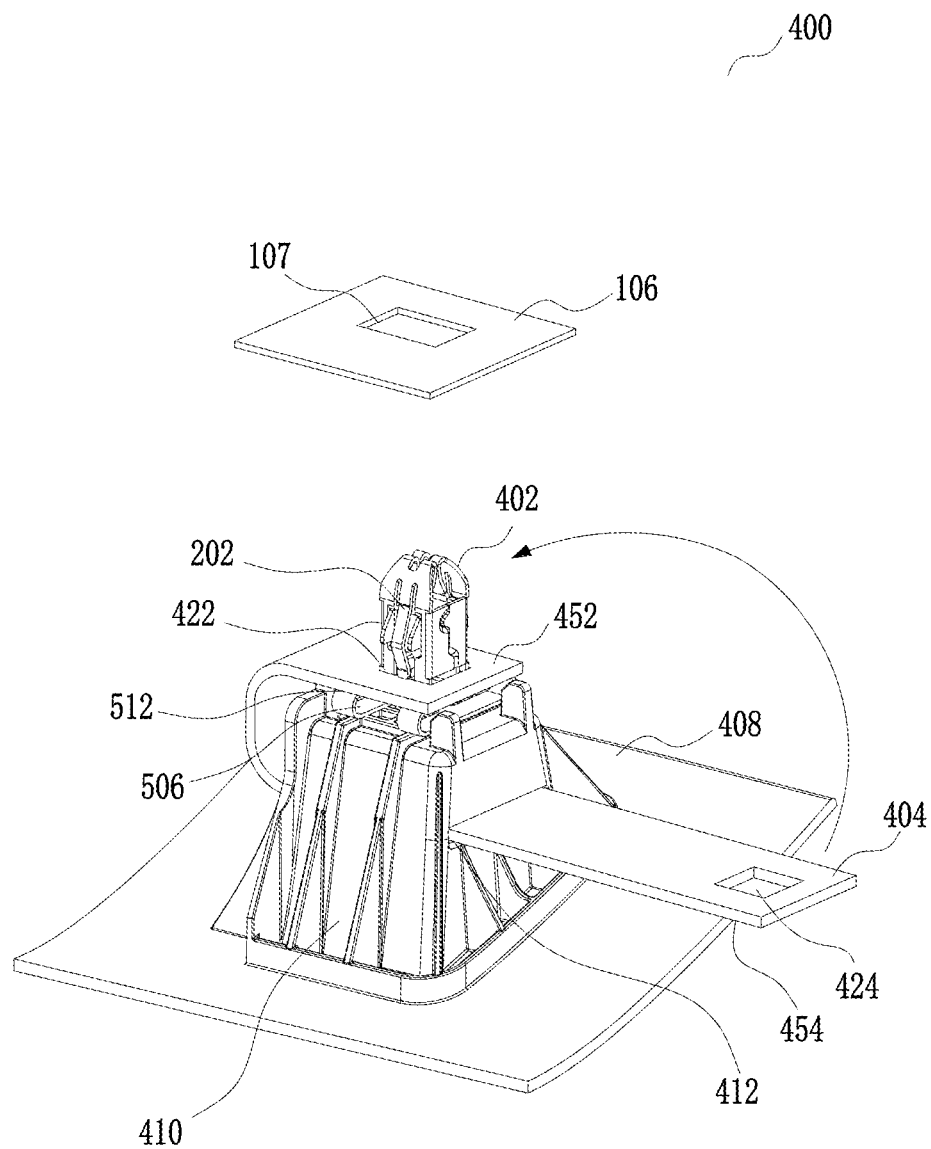
FIG. 6B is a second schematic diagram illustrating an assembly process of the fastener shown in FIG. 4A.
Figure 6C:
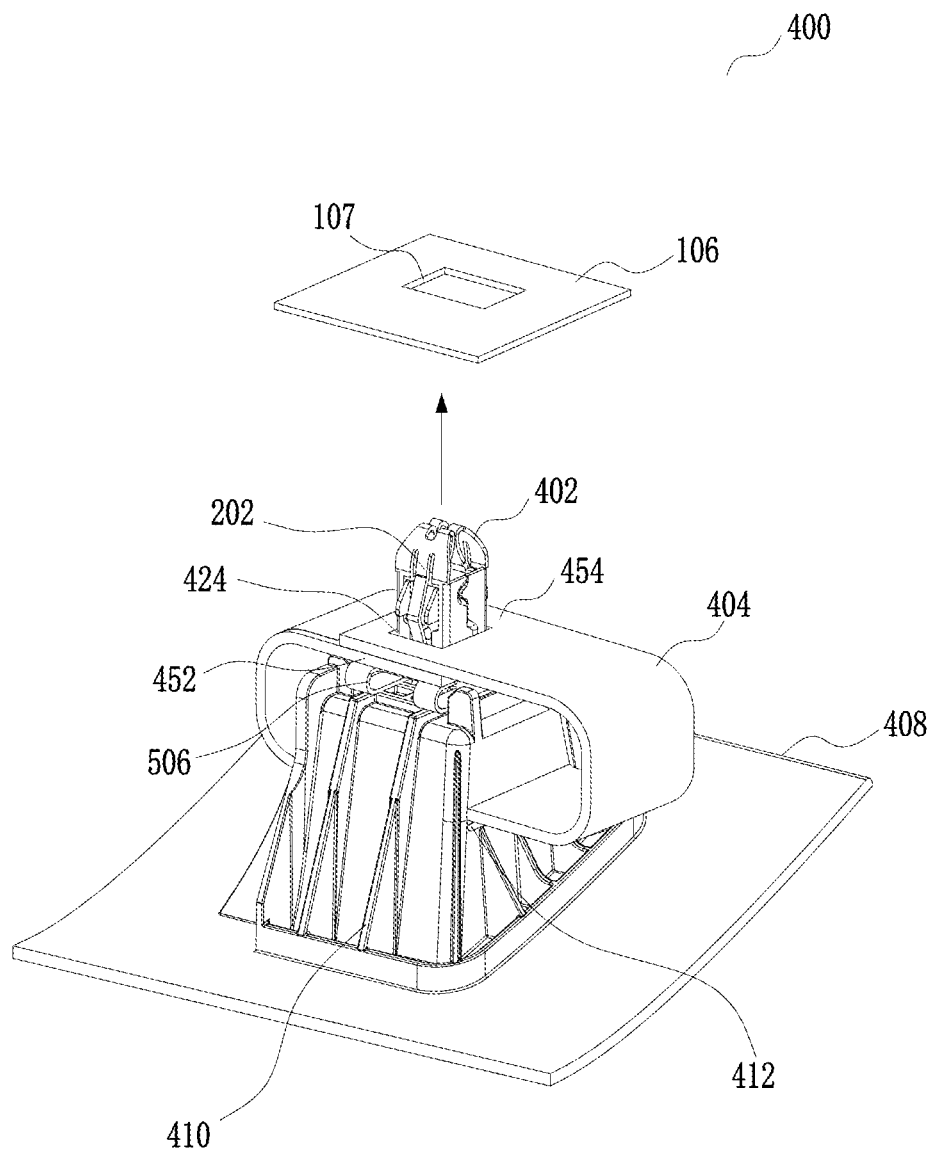
FIG. 6C is a third schematic diagram illustrating an assembly process of the fastener shown in FIG. 4A.

FIGS. 6A to 6C are schematic diagrams illustrating the process of assembling the fastener 400 shown in FIG. 4A.

As shown in FIG. 6A, when assembling the fastener 400, the elastic strap 404 first extends through the elastic strap connecting hole 412 of the vehicle inner trim panel 408, and the trim panel securing portion 204 of the fastener body 402 is inserted into the securing hole 114 of the vehicle inner trim panel 408 to secure the fastener body 402 and the vehicle inner trim panel 408 together.

As shown in FIG. 6B, after the elastic strap 404 extends through the elastic strap connecting hole 412 of the vehicle inner trim panel 408, the elastic strap first end 452 of the elastic strap 404 is bent, and the vehicle securing portion 202 of the fastener body 402 extends through the elastic strap first opening 422 of the elastic strap first end 452, so that the elastic strap first end 452 is sleeved between the vehicle securing portion 202 and the elastic member securing portion 506 of the fastener body 402 and abuts the upper surface of the elastic member securing portion upper section 512.

As shown in FIG. 6C, after the elastic strap first end 452 is sleeved between the vehicle securing portion 202 and the elastic member securing portion 506 of the fastener body 402 and abuts the upper surface of the elastic member securing portion upper section 512, in the same way, the elastic strap second end 454 is sleeved between the vehicle securing portion 202 of the fastener body 402 and the elastic strap first end 452. And finally, the vehicle securing portion 202 is inserted into the securing hole 107 in the vehicle interior metal plate 106, so as to secure the fastener body 402 and the vehicle interior metal plate 106 together to finally form the state shown in FIG. 4A. At this time, the elastic strap first end 452 and the elastic strap second end 454 of the elastic strap 404 are both secured between the vehicle interior metal plate 106 and the elastic member securing portion 506, and form loop configuration to connect the fastener body 402 and vehicle inner trim panel 408 together.

Compared with the fasteners in the prior art, the fastener of the present disclosure has the advantages as follows:

First, the fastener of the present disclosure is in two-level connection with the vehicle inner trim panel, that is, the first level of connection of directly securing to the inner trim panel by means of the fastener body, and the second level of connection of flexibly connecting with the inner trim panel by means of the elastic ropes connected with the fastener body. When the inner trim panel is ejected by means of the airbag(s), the elastic ropes may provide a buffer or brake pulling force against the high-speed movement of the inner trim panel, avoiding the injury to persons caused by the ejected inner trim panel.

Second, the fastener body of the present disclosure is connected with the inner trim panel directly by means of the elastic ropes. Compared with traditional fasteners which are connected with an anchor member by means of an elastic rope and then connected with an inner trim panel by means of the anchor member, the fastener body of the present disclosure is connected with the inner trim panel directly by means of the elastic ropes, so as to prevent the inner trim panel from being unexpected blown off due to the damage of the anchor member and the inner trim panel caused by collision of the anchor member to the inner trim panel under high applied force.

Third, in the first embodiment of the present disclosure, the fastener body is connected with the inner trim panel by means of the two loop-shaped elastic ropes, so as to achieve more uniform forces applied to the fastener body to avoid unexpected damage to the fastener body. Also, the elastic ropes come into contact and are connected with the sleeve-shaped engaging members of the fastener body and the securing grooves of an inner trim panel holder by means of the loop configurations thereof, so that the force-bearing area of the elastic ropes is increased to prevent the elastic ropes from breaking or damage under high stress.

Fourth, in the second embodiment of the present disclosure, the elastic strap is sleeved, by means of the opening of the elastic strap and in loop configuration, between the upper surface of the elastic member securing portion and the vehicle interior metal plate. Since it is not limited by the elastic strap, the elastic member securing portion in the folded state can be less folded and deformed under the action of the impact force, thereby further absorbing the energy of the impact force and achieving the secondary buffering and braking.

Fifth, the fastener body of the present disclosure is made of metal, such as high-carbon steel, which can withstand larger pulling-out force and is less prone to damage.

Sixth, the fastener body of the present disclosure is connected with the vehicle metal plate by means of the vehicle securing legs with different slopes, which can compensate for the manufacturing tolerances of the metal plate securing holes to facilitate the mounting of the fastener body to the metal plate.

Seventh, compared with the fastener assembly in the prior art which is connected with the inner trim panel by means of the anchor member, the fastener of the present disclosure uses fewer parts, thereby reducing the production cost.

Although the present disclosure is described with respect to the examples of the embodiments outlined above, various alternatives, modifications, variations, improvements, and/or substantial equivalents that are known or current or to be anticipated later may be apparent to those of at least ordinary skill in the art. In addition, the technical effects and/or technical problems described in the present disclosure are illustrative rather than restrictive. Therefore, the disclosed description in the present disclosure may be used to solve other technical problems and have other technical effects and/or may solve other technical problems. Accordingly, the examples of the embodiments of the present disclosure as set forth above are intended to be illustrative rather than limiting. Various changes can be made without departing from the spirit or scope of the present disclosure. Therefore, the present disclosure is intended to include all known or earlier developed alternatives, modifications, variations, improvements and/or substantial equivalents.

What is claimed is:

1. A fastener, comprising:
    a fastener body comprising:
    a vehicle securing portion, disposed on one end of the fastener body and used for securing to a vehicle body;
    a trim panel securing portion, disposed on one end of the fastener body opposite to the vehicle securing portion and used for securing to a vehicle accessory; and
    an elastic member securing portion disposed between the vehicle securing portion and the trim panel securing portion and connecting the vehicle securing portion with the trim panel securing portion, the elastic member securing portion configured to connect with the vehicle accessory via a first elastic rope and a second elastic rope,
        wherein the elastic member securing portion comprises a first engaging member configured to connect with the vehicle accessory via the first elastic rope and a second engaging member configured to connect with the vehicle accessory via the second elastic rope.

2. The fastener as claimed in claim 1, wherein
the first engaging member and the second engaging member are symmetrically disposed with respect to the elastic member securing portion.

3. The fastener as claimed in claim 1, wherein
each of the first engaging member and the second engaging member is a sleeve-shaped engaging member, the sleeve-shaped engaging member being provided with openings on two ends thereof,
wherein the sleeve-shaped engaging member are configured to enable the rope to enter the openings on one end of the sleeve-shaped engaging member and exit the openings on the other end of the sleeve-shaped engaging member.

4. The fastener as claimed in claim 1, wherein
the vehicle securing portion comprises two opposite securing sides and two opposite reinforcement sides, the two opposite securing sides and the two opposite reinforcement sides being adjacent to each other.

5. The fastener as claimed in claim 4, wherein
the vehicle securing portion comprises vehicle securing legs, the vehicle securing legs being formed by extending downwardly and outwardly from middle portions of upper outside portions of the two opposite securing sides,
wherein the vehicle securing legs comprise upslope portions and downslope portions.

6. The fastener as claimed in claim 4, wherein
the vehicle securing portion comprises wedge-shaped stops, the wedge-shaped stops being located on the two opposite securing sides, and
the vehicle securing portion further comprises bending portions, the bending portions being formed by extending downwardly and inwardly from two side portions of the upper outside portions of the two opposite securing sides, the bending portions being configured to abut upper surfaces of the wedge-shaped stops, for preventing the wedge-shaped stops from sliding when subjected to upwardly applied force.

7. The fastener as claimed in claim 4, wherein the vehicle securing portion further comprises reinforcement portions, the reinforcement portions being formed by bending the two opposite securing sides towards the two opposite reinforcement sides, the reinforcement portions being configured to be serrated structures for increasing strength of the fastener body.

8. The fastener as claimed in claim 1, wherein the trim panel securing portion comprises trim panel securing legs, the trim panel securing legs being formed by extending upwardly and outwardly from lower portion of the opposite two sides of the trim panel securing portion for securing vehicle inner trim panel.

9. The fastener as claimed in claim 1, wherein at least one of the first elastic rope and the second elastic rope is connected at two ends thereof to form a loop configuration, the at least one elastic rope is configured to extend through the at least one engaging member on the elastic member securing portion so as to connect with the elastic member securing portion.

10. The fastener as claimed in claim 1, wherein the inner portion of the at least one elastic rope is made of an elastic rubber material.

11. The fastener as claimed in claim 1, wherein the elastic member securing portion has a folded structure protruding from the vehicle securing portion towards the outside of the fastener body to enable the folded structure to abut the elastic member.

12. The fastener as claimed in claim 11, wherein the elastic member is an elastic strap, the elastic strap being configured to connect the fastener body and the vehicle accessory together.

13. The fastener as claimed in claim 12, wherein the elastic strap is configured to be fixed between the vehicle body and the folded structure of the elastic member securing portion.

14. The fastener as claimed in claim 11, wherein the folded structure of the elastic member securing portion is configured to be elastically deformable when subjected to an external force so as to buffer the external force.

15. A fastener assembly, comprising:
a fastener body comprising:
  a vehicle securing portion disposed on one end of the fastener body and configured to secure to a vehicle body;
  a trim panel securing portion disposed on one end of the fastener body opposite to the vehicle securing portion and configured to secure to a vehicle accessory; and
  an elastic member securing portion disposed between the vehicle securing portion and the trim panel securing portion, the elastic member securing portion comprising at least one engaging member;

a first elastic rope connected at two ends thereof to form a loop configuration and connected with the at least one engaging member;
a second elastic rope connected at two ends thereof to form a loop configuration and connected with the at least one engaging member; and
  wherein each of the first elastic rope and the second elastic rope is configured to extend through one of the at least one engaging member on the elastic member securing portion to connect with the elastic member securing portion.

16. The fastener as claimed in claim 15, wherein the at least one engaging member includes two engaging members symmetrically disposed with respect to the elastic member securing portion.

17. The fastener as claimed in claim 15, wherein the vehicle securing portion comprises two opposite securing sides and two opposite reinforcement sides, the two opposite securing sides and the two opposite reinforcement sides being adjacent to each other.

18. A fastener, comprising:
a fastener body, the fastener body comprising:
a vehicle securing portion, the vehicle securing portion being disposed on one end of the fastener body and used for securing to a vehicle body;
a trim panel securing portion, the trim panel securing portion being disposed on one end of the fastener body opposite to the vehicle securing portion and used for securing to a vehicle accessory;
an elastic member securing portion, the elastic member securing portion being disposed between the vehicle securing portion and the trim panel securing portion and connecting the vehicle securing portion with the trim panel securing portion, and the elastic member securing portion comprising a first sleeve-shaped engaging member and a second sleeve-shaped engaging member, and
a first elastic rope and a second elastic rope, the first elastic rope being connected at two ends thereof to form loop configuration, and the second elastic rope being connected at two ends thereof to form loop configuration, wherein the first elastic rope is configured to extend through the first sleeve-shaped engaging member so as to connect with the elastic member securing portion, and the second elastic rope is configured to extend through the second sleeve-shaped engaging member so as to connect with the elastic member securing portion.

19. The fastener as claimed in claim 18, wherein the vehicle securing portion comprises vehicle securing legs and wedge-shaped stops,
wherein the vehicle securing legs comprise upslope portions and downslope portions.

20. The fastener as claimed in claim 18, wherein the first elastic rope and the second elastic rope are used to flexibly connect to the vehicle accessories.

* * * * *